United States Patent
Peper et al.

(10) Patent No.: US 10,824,818 B2
(45) Date of Patent: *Nov. 3, 2020

(54) SYSTEMS AND METHODS FOR MACHINE LEARNING-BASED MULTI-INTENT SEGMENTATION AND CLASSIFICATION

(71) Applicant: Clinc, Inc., Ann Arbor, MI (US)

(72) Inventors: Joseph Peper, Ann Arbor, MI (US); Parker Hill, Ann Arbor, MI (US); Kevin Leach, Ann Arbor, MI (US); Sean Stapleton, Ann Arbor, MI (US); Jonathan K. Kummerfeld, Ann Arbor, MI (US); Johann Hauswald, Ann Arbor, MI (US); Michael Laurenzano, Ann Arbor, MI (US); Lingjia Tang, Ann Arbor, MI (US); Jason Mars, Ann Arbor, MI (US)

(73) Assignee: Clinc, Inc., Ann Arbor, MI (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/854,834

(22) Filed: Apr. 21, 2020

(65) Prior Publication Data
US 2020/0257857 A1 Aug. 13, 2020

Related U.S. Application Data

(63) Continuation of application No. 16/783,604, filed on Feb. 6, 2020.
(Continued)

(51) Int. Cl.
*G06F 40/30* (2020.01)
*G06N 7/00* (2006.01)
(Continued)

(52) U.S. Cl.
CPC ............ *G06F 40/30* (2020.01); *G06F 40/284* (2020.01); *G06N 7/005* (2013.01); *G06N 20/00* (2019.01);
(Continued)

(58) Field of Classification Search
CPC ........... G10L 15/063; G10L 2015/0631; G10L 2015/0633; G10L 2015/0635;
(Continued)

(56) References Cited

U.S. PATENT DOCUMENTS 8,572,087 B1 * 10/2013 Yagnik ............... G06K 9/00684
707/738
10,559,307 B1 * 2/2020 Khaleghi ................ G10L 25/66
(Continued)

OTHER PUBLICATIONS

Kim, Byeongchang, et al. "Two-stage multi-intent detection for spoken language understanding." Multimedia Tools and Applications 76.9, Jul. 2016, pp. 11377-11390. (Year: 2016).*
(Continued)

*Primary Examiner* — James S Wozniak
(74) *Attorney, Agent, or Firm* — Padowithz Alce

(57) ABSTRACT

Systems and methods for synthesizing training data for multi-intent utterance segmentation include identifying a first corpus of utterances comprising a plurality of distinct single-intent in-domain utterances; identifying a second corpus of utterances comprising a plurality of distinct single-intent out-of-domain utterances; identifying a third corpus comprising a plurality of distinct conjunction terms; forming a multi-intent training corpus comprising synthetic multi-intent utterances, wherein forming each distinct multi-intent utterance includes: selecting a first distinct in-domain utterance from the first corpus of utterances; probabilistically selecting one of a first out-of-domain utterance from the second corpus and a second in-domain utterance from the first corpus; probabilistically selecting or not selecting a
(Continued)

distinct conjunction term from the third corpus; and forming a synthetic multi-intent utterance including appending the first in-domain utterance with one of the first out-of-domain utterance from the second corpus of utterances and the second in-domain utterance from the first corpus of utterances.

17 Claims, 5 Drawing Sheets

Related U.S. Application Data

(60) Provisional application No. 62/969,695, filed on Feb. 4, 2020, provisional application No. 62/890,247, filed on Aug. 22, 2019, provisional application No. 62/802,342, filed on Feb. 7, 2019.

(51) Int. Cl.
| | | |
|---|---|---|
| *G06N 20/00* | (2019.01) | |
| *G06F 40/284* | (2020.01) | |
| *G10L 15/18* | (2013.01) | |
| *G10L 15/06* | (2013.01) | |
| *G10L 15/16* | (2006.01) | |

(52) U.S. Cl.
CPC ........ *G10L 15/1822* (2013.01); *G10L 15/063* (2013.01); *G10L 15/16* (2013.01); *G10L 15/1815* (2013.01); *G10L 2015/0633* (2013.01); *G10L 2015/0636* (2013.01)

(58) Field of Classification Search
CPC ............. G10L 2015/0636; G10L 15/16; G10L 15/1815; G10L 15/1822; G06F 40/30; G06F 40/284; G06F 40/35; G06N 7/005
USPC ................................................ 704/243, 245
See application file for complete search history.

(56) References Cited

U.S. PATENT DOCUMENTS

| | | | | |
|---|---|---|---|---|
| 2011/0077943 | A1* | 3/2011 | Miki | G10L 15/183 |
| | | | | 704/250 |
| 2014/0222422 | A1* | 8/2014 | Sarikaya | G06F 40/35 |
| | | | | 704/231 |
| 2015/0149177 | A1* | 5/2015 | Kalns | G10L 15/1822 |
| | | | | 704/257 |
| 2015/0149182 | A1* | 5/2015 | Kalns | G10L 15/18 |
| | | | | 704/275 |
| 2017/0372199 | A1* | 12/2017 | Hakkani-Tur | G06N 3/08 |
| 2018/0018589 | A1* | 1/2018 | Fink | G06N 20/00 |
| 2018/0330721 | A1* | 11/2018 | Thomson | G10L 15/1815 |
| 2019/0027134 | A1* | 1/2019 | Kakirwar | G06F 3/167 |
| 2019/0102701 | A1* | 4/2019 | Singaraju | G06F 16/322 |
| 2019/0258710 | A1* | 8/2019 | Biyani | G06F 40/253 |
| 2019/0340243 | A1* | 11/2019 | Beaver | G06F 40/30 |
| 2019/0378006 | A1* | 12/2019 | Fukuda | G06K 9/6293 |
| 2020/0019641 | A1* | 1/2020 | Tonetti | G06F 16/3329 |
| 2020/0043480 | A1* | 2/2020 | Shen | G10L 15/1815 |
| 2020/0110805 | A1* | 4/2020 | Beaver | G06F 3/04817 |
| 2020/0117996 | A1* | 4/2020 | Chang | G06N 3/08 |
| 2020/0152184 | A1* | 5/2020 | Steedman Henderson | |
| | | | | G06N 3/08 |

OTHER PUBLICATIONS

Radhakrishna, Arun Sethupat. Intent Based Utterance Segmentation for Multi IntentNLU. Diss. University of Minnesota, Aug. 2019, pp. 1-36. (Year: 2019).*

Shet, Rohan, et al. "Segmenting multi-intent queries for spoken language understanding." Studientexte zur Sprachkommunikation: Elektronische Sprachsignalverarbeitung 2019, Mar. 2019, pp. 141-147. (Year: 2019).*

Xu, Puyang, et al. "Exploiting shared information for multi-intent natural language sentence classification." Interspeech, Aug. 2013. (Year: 2013).*

* cited by examiner

Sourcing Single-Intent Utterance Data S210

Configuring One or More Input Sources S220

Generating a Training Corpus S230

Synthesizing a Multi-Intent Utterance S240

Training a Multi-Intent Classifier Model S250

FIGURE 2

Predicting Sentence Boundaries S310

Identifying Boundary Tokens S320

Segmenting an Utterance Based On Boundaries S330

Individually Feeding Each Segment Into a Classifier S340

Individually Feeding Each Segment Into a Classifier S350

FIGURE 3

SYSTEMS AND METHODS FOR MACHINE LEARNING-BASED MULTI-INTENT SEGMENTATION AND CLASSIFICATION

CROSS-REFERENCE TO RELATED APPLICATIONS

This application is a continuation of U.S. patent application Ser. No. 16/783,604, filed 6 Feb. 2020, which claims the benefit of U.S. Provisional Application No. 62/802,342, filed 7 Feb. 2019, U.S. Provisional Application No. 62/890,247, filed 22 Aug. 2019, and U.S. Provisional Application No. 62/969,695, which are all incorporated in their entireties by this reference.

GOVERNMENT RIGHTS

The subject matter of the invention may be subject to U.S. Government Rights under National Science Foundation grants: NSF SBIR Phase 1 Grant-1622049 and NSF SBIR Phase 2 Grant-1738441.

TECHNICAL FIELD

The inventions herein relate generally to the machine learning and artificially intelligent dialogue systems fields, and more specifically to a new and useful system and method for intelligently synthesizing training data and training machine learning models of a machine learning-based conversational service in the machine learning field.

BACKGROUND

Modern virtual assistants and/or online chatbots may typically be employed to perform various tasks or services based on an interaction with a user. Typically, a user interacting with a virtual assistant may pose a question or otherwise submit a command to the virtual assistant to which the virtual assistant may provide a response or a result. Many of these virtual assistants may be implemented using a rules-based approach, which typically requires coding or preprogramming many or hundreds of rules that may govern a manner in which the virtual assistant should operate to respond to a given query or command from a user.

While the rules-based approach for implementing a virtual assistant may be useful for addressing pointed or specific queries or commands made by a user, the rigid or finite nature of this approach severely limits a capability of a virtual assistant to address queries or commands from a user that exceed the scope of the finite realm of pointed and/or specific queries or commands that are addressable by the finite set of rules that drive the response operations of the virtual assistant.

That is, the modern virtual assistants implemented via a rules-based approach for categorizing user input and generating responses to users may not fully satisfy queries and commands posed by a user for which there are no predetermined rules to provide a meaningful response or result to the user.

Therefore, there is a need in the machine learning field and virtual dialogue service fields for systems and methods that enable intelligent techniques for categorizing unstructured data to structured categories of a machine learning-based dialogue service. The embodiments of the present application described herein provide technical solutions that address, at least, the need described above, as well as the deficiencies of the state of the art described throughout the present application.

SUMMARY OF THE INVENTION(S)

In one embodiment, a method for synthesizing training data for multi-intent utterance segmentation within a machine learning-based dialogue system includes identifying a first corpus of utterances comprising a plurality of distinct single-intent in-domain utterances; identifying a second corpus of utterances comprising a plurality of distinct single-intent out-of-domain utterances; identifying a third corpus comprising a plurality of distinct conjunction terms; forming, by the machine learning-based dialogue system, a multi-intent training corpus comprising synthetic multi-intent utterances, wherein forming each distinct multi-intent utterance of the multi-intent training corpus includes: selecting a first distinct in-domain utterance from the plurality of distinct single-intent in-domain utterances of the first corpus of utterances; probabilistically selecting one of a first out-of-domain utterance from the second corpus of utterances and a second in-domain utterance from the first corpus of utterances; probabilistically selecting or not selecting a distinct conjunction term from the third corpus of conjunction terms; and forming a synthetic multi-intent utterance including appending the first in-domain utterance with one of the first out-of-domain utterance from the second corpus of utterances and the second in-domain utterance from the first corpus of utterances.

In one embodiment, the method includes identifying a conjunction-inclusion probability that a conjunction term would be appended to the first distinct in-domain utterance; and if the conjunction-inclusion probability satisfies or exceeds a conjunction-inclusion threshold, randomly selecting a distinct conjunction term from the plurality of distinct conjunction terms of the third corpus.

In one embodiment, the method includes identifying an out-of-domain-inclusion probability that an out-of-domain utterance would be appended to the first distinct in-domain utterance, wherein if the out-of-domain-inclusion probability satisfies or exceeds an out-of-domain-inclusion threshold, randomly selecting a first distinct out-of-domain utterance from the plurality of distinct single-intent out-of-domain utterances of the second corpus of utterances.

In one embodiment, the method includes in response to selecting the first distinct out-of-domain utterance, concatenating the distinct conjunction term to a boundary of the first in-domain utterance and concatenating the first distinct out-of-domain utterance after the distinct conjunction term.

In one embodiment, the method includes identifying an out-of-domain-inclusion probability that an out-of-domain utterance would be appended to the first distinct in-domain utterance, wherein if the out-of-domain-inclusion probability does not satisfy the out-of-domain-inclusion threshold, randomly selecting a second distinct in-domain utterance from the plurality of distinct single-intent in-domain utterances of the first corpus of utterances.

In one embodiment, the method includes identifying a conjunction-inclusion probability that a conjunction term would be appended to the first distinct in-domain utterance; if the conjunction-inclusion probability satisfies or exceeds a conjunction-inclusion threshold, randomly selecting a distinct conjunction term from the plurality of distinct conjunction terms of the third corpus; identifying an out-of-domain-inclusion probability that an out-of-domain utterance would be appended to the first distinct in-domain utterance, wherein: (i) if the out-of-domain-inclusion probability satisfies or exceeds an out-of-domain-inclusion threshold, randomly selecting a first distinct out-of-domain utterance from the plurality of distinct single-intent out-of-domain utterances of the second corpus of utterances, or (ii) if the out-of-domain-inclusion probability does not satisfy the out-of-domain-inclusion threshold, randomly selecting a second distinct in-domain utterance from the plurality of distinct single-intent in-domain utterances of the first corpus of utterances.

In one embodiment, each of the plurality of distinct single-intent in-domain utterances of the first corpus comprise a single-intent in-domain utterance, and each of the plurality of distinct single-intent out-of-domain utterances of the second corpus comprise a single-intent out-of-domain utterance.

In one embodiment, the method includes training a span-predicting utterance segmentation model using the multi-intent training corpus, wherein the span-predicting utterance segmentation model classifies each distinct utterance span of a subject multi-intent utterance that forms a complete semantic expression within the subject multi-intent utterance.

In one embodiment, the method includes receiving an input multi-intent utterance at the machine learning-based dialogue system; predicting two or more boundary classification labels for two or more distinct tokens of the input multi-intent utterance; and segmenting, at two or more boundary classification labels, the input multi-intent utterance into two or more distinct single-intent utterance components.

In one embodiment, the method includes providing each of the two or more distinct single-intent utterance components to one of a plurality of concurrently operating distinct single-intent machine learning classifiers; and generating by each respective one of the plurality of concurrently operating distinct machine learning classifiers an intent classification label for each of the two or more distinct single-intent utterance components.

In one embodiment, the method includes training a joint model using the multi-intent training corpus comprising synthetic multi-intent utterances, wherein the joint model perform multiple distinct machine learning tasks, the joint model comprising an intent machine learning classifier that predicts an intent label for a target utterance and a slot segment machine learning model that predicts a slot label that identifies a semantic concept of a given segment of the target utterance.

In one embodiment, the method includes receiving an input multi-intent utterance; and identifying whether the input multi-intent utterance is an entangled multi-intent utterance based on an entanglement threshold, wherein an entangled multi-intent utterance relates to a subject multi-intent utterance in which two or more distinct intents within the subject multi-intent utterance cannot be disintegrated with ease and satisfy or exceed an entanglement threshold.

In one embodiment, if the input multi-intent utterance comprises the entangled multi-intent utterance, providing the entangled multi-intent utterance as input into the joint model; at the joint model, predicting an intent classification label and a slot value classification label for each identified token of the entangled multi-intent utterance.

In one embodiment, the method includes training a joint model with segmentation using the multi-intent training corpus comprising synthetic multi-intent utterances, where the joint model with segmentation performs multi-distinct machine learning tasks, the joint model with segmentation including (i) a combination of a segmentation model, (ii) an intent classification model, and (iii) a slot value classification model.

In one embodiment, the method includes receiving an input multi-intent utterance; and identifying whether the input multi-intent utterance comprises a long, multi-intent utterance based on an aggregated span threshold, wherein the long, multi-intent utterance relates to a subject multi-intent utterance in which an aggregate of multiple distinct utterance spans of the subject multi-intent utterance satisfies or exceeds an aggregated span threshold.

In one embodiment, if the input multi-intent utterance comprises the long multi-intent utterance, providing the long multi-intent utterance as input into the joint model with segmentation; at the joint model with segmentation, (i) predicting two or more boundary classification labels for two or more distinct tokens of the long multi-intent utterance, (ii) predicting an intent classification label and (iii) a slot value classification label for each identified token of the long multi-intent utterance.

In one embodiment, a method for synthesizing training data for multi-intent utterance segmentation within a single-intent machine learning-based dialogue system includes sourcing a first corpus of utterances comprising a plurality of distinct single-intent in-domain utterances; sourcing a second corpus of utterances comprising a plurality of distinct single-intent out-of-domain utterances; sourcing a third corpus comprising a plurality of distinct conjunction terms; constructing, by the machine learning-based dialogue system, a multi-intent training corpus comprising synthetic multi-intent utterances, wherein forming each distinct multi-intent utterance of the multi-intent training corpus includes: selecting a first distinct in-domain utterance from the plurality of distinct single-intent in-domain utterances of the first corpus of utterances; probabilistically selecting one of a first out-of-domain utterance from the second corpus of utterances and a second in-domain utterance from the first corpus of utterances; probabilistically selecting or not selecting a distinct conjunction term from the third corpus of conjunction terms; and constructing a synthetic multi-intent utterance including appending the first in-domain utterance with one of the first out-of-domain utterance from the second corpus of utterances and the second in-domain utterance from the first corpus of utterances.

In one embodiment, the method includes computing, by the machine learning-based system, a conjunction-inclusion probability that a conjunction term would be appended to the first distinct in-domain utterance; if the conjunction-inclusion probability satisfies or exceeds a conjunction-inclusion threshold, randomly selecting a distinct conjunction term from the plurality of distinct conjunction terms of the third corpus; computing, by the machine learning-based system, an out-of-domain-inclusion probability that an out-of-domain utterance would be appended to the first distinct in-domain utterance, wherein: (i) if the out-of-domain-inclusion probability satisfies or exceeds an out-of-domain-inclusion threshold, randomly selecting a first distinct out-of-domain utterance from the plurality of distinct single-intent out-of-domain utterances of the second corpus of utterances, or (ii) if the out-of-domain-inclusion probability does not satisfy the out-of-domain-inclusion threshold, randomly selecting a second distinct in-domain utterance from the plurality of distinct single-intent in-domain utterances of the first corpus of utterances.

In one embodiment, a system for intelligently synthesizing training data for multi-intent utterance segmentation within a machine learning-based dialogue system, the system includes a datastore comprising: a first corpus of utterances comprising a plurality of distinct single-intent in-domain utterances; a second corpus of utterances comprising a plurality of distinct single-intent out-of-domain utterances; a third corpus comprising a plurality of distinct conjunction terms; a machine learning-based dialogue system being implemented by a distributed network of computers includes: a training data synthesis module that: constructs a multi-intent training corpus comprising synthetic multi-intent utterances, wherein forming each distinct multi-intent utterance of the multi-intent training corpus includes: selects a first distinct in-domain utterance from the plurality of distinct single-intent in-domain utterances of the first corpus of utterances; probabilistically selects one of a first out-of-domain utterance from the second corpus of utterances and a second in-domain utterance from the first corpus of utterances; probabilistically selects or not selects a distinct conjunction term from the third corpus of conjunction terms; and constructs a synthetic multi-intent utterance including appending the first in-domain utterance with one of the first out-of-domain utterance from the second corpus of utterances and the second in-domain utterance from the first corpus of utterances.

BRIEF DESCRIPTION OF THE FIGURES

FIG. 2 illustrates an example method in accordance with one or more embodiments of the present application;

FIG. 3 illustrates another example method in accordance with one or more embodiments of the present application.

DESCRIPTION OF THE PREFERRED EMBODIMENTS

The following description of the preferred embodiments of the present application are not intended to limit the inventions to these preferred embodiments, but rather to enable any person skilled in the art to make and use these inventions.

1. System for a Machine Learning-Based Dialogue System

Figure 1:
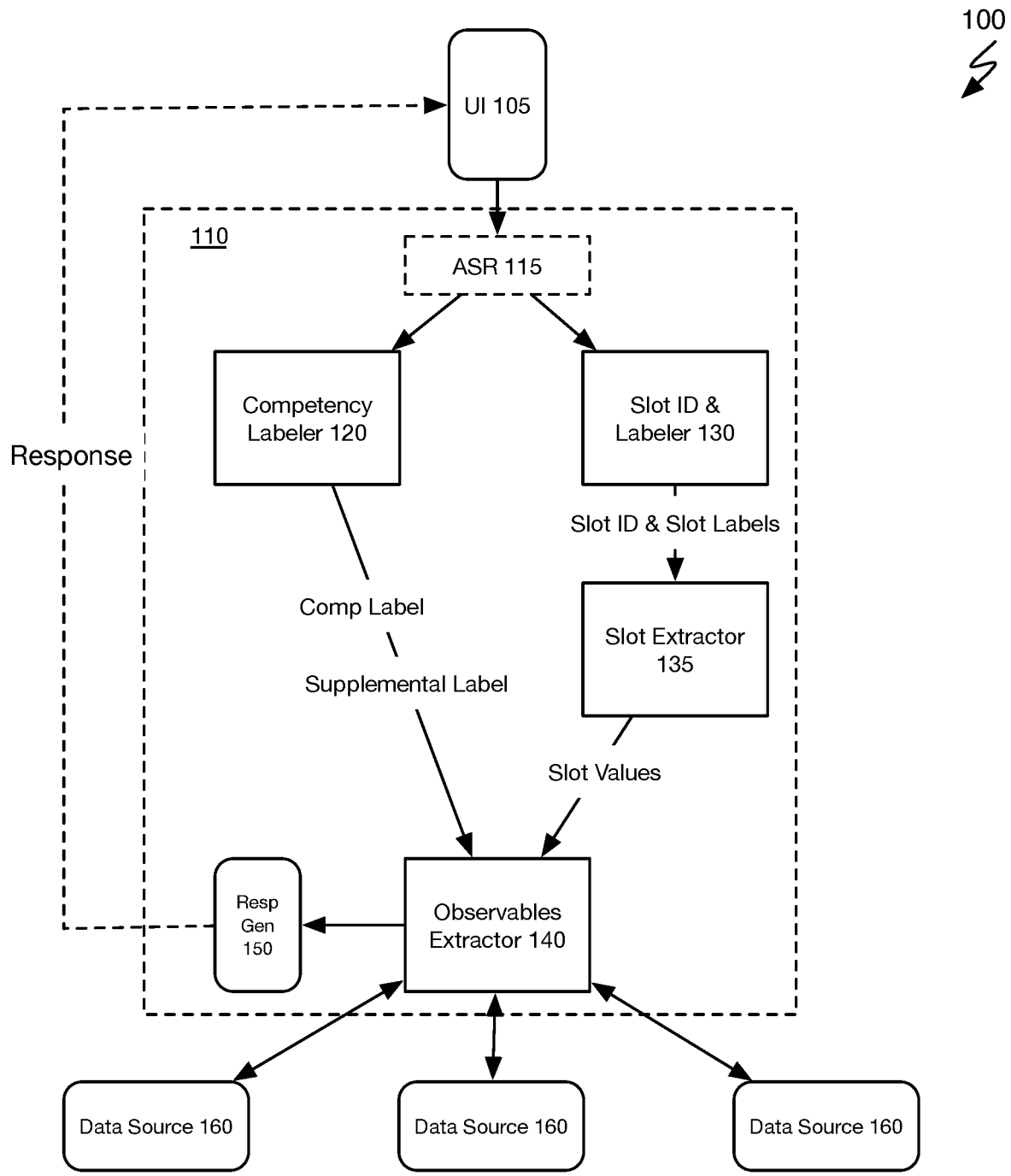
FIG. 1 illustrates a schematic representation of a system 100 in accordance with one or more embodiments of the present application.

As shown in FIG. 1, a system 100 that automatically trains and/or configures machine learning models includes an artificial intelligence (AI) virtual assistant platform 110 (e.g., artificially intelligent dialogue platform), a machine learning configuration interface 120, a training/configuration data repository 130, a configuration data queue 135, and a plurality of external training/configuration data sources 140.

Generally, the system 100 functions to implement the artificial intelligence virtual assistant platform 110 to enable intelligent and conversational responses by an artificially intelligent virtual assistant to a user query and/or user command input into the system 100, as described in U.S. patent application Ser. Nos. 15/797,414 and 15/821,010, which are both incorporated herein in their entireties by this reference. Specifically, the system 100 functions to ingest user input in the form of text or speech into a user interface 160. At natural language processing components of the system 100 that may include, at least, the competency classification engine 120 the slot identification engine 130, and a slot value extractor 135, the system 100 functions to identify a competency classification label for the user input data and parse the user input data into comprehensible slots or segments that may, in turn, be converted into program-comprehensible and/or useable features. Leveraging the outputs of the natural language processing components of the system 100, the observables extractor 140 may function to generate handlers based on the outcomes of the natural language processing components and further, execute the generated handlers to thereby perform various operations that accesses one or more data sources relevant to the query or command and that also performs one or more operations (e.g., data filtering, data aggregation, and the like) to the data accessed from the one or more data sources.

The artificial intelligence virtual assistant platform 110 functions to implement an artificially intelligent virtual assistant capable of interacting and communicating with a user. The artificial intelligence platform 110 may be implemented via one or more specifically configured web or private computing servers (or a distributed computing system; e.g., the cloud) or any suitable system for implementing the system 100 and/or the method 200.

In some implementations, the artificial intelligence virtual assistant platform no may be a remote platform implemented over the web (e.g., using web servers) that is configured to interact with distinct and disparate service providers. In such implementation, an event such as a user attempting to access one or more services or data from one or more data sources of the service provider may trigger an implementation of the artificially intelligent virtual assistant of the AI platform no. Thus, the AI virtual assistant platform 110 may work in conjunction with the service provider to attend to the one or more queries and/or commands of the users of the service provider. In this implementation, the data sources 160 may be data sources of the service provider that are external data sources to the AI virtual assistant platform 110.

The competency classification engine 120 together with the slot identification engine 130 and the slot value extractor 135 preferably function to define a natural language processing (NLP) component of the artificial intelligence platform 110. In one implementation, the natural language processing component may additionally include the automatic speech recognition unit 105.

The competency classification engine 120 functions to implement one or more competency classification machine learning models to label user input data comprising a user query or a user command. The one or more competency classification machine learning models may include one or more deep machine learning algorithms (e.g., a recurrent neural network, etc.) that have been specifically trained to identify and/or classify a competency label for utterance input and/or textual input. The training input used in training the one or more deep machine learning algorithms of the competency classification engine 120 may include crowd-sourced data obtained from one or more disparate user query or user command data sources and/or platforms (e.g., messaging platforms, etc.). However, it shall be noted that the system 100 may obtain training data from any suitable external data sources. The one or more deep machine learning algorithms may additionally be continually trained using user queries and user commands that were misspredicted or incorrectly analyzed by the system 100 including the competency classification engine 120.

The competency classification engine 120 may additionally be configured to generate or identify one competency classification label for each user query and/or user command input into the engine 120. The competency classification engine 120 may be configured to identify or select from a plurality of predetermined competency classification labels (e.g., Income, Balance, Spending, Investment, Location, etc.). Each competency classification label available to the competency classification engine 120 may define a universe of competency-specific functions available to the system 100 or the artificially intelligent assistant for handling a user query or user command. That is, once a competency classification label is identified for a user query or user command, the system 100 may use the competency classification label to restrict one or more computer-executable operations (e.g., handlers) and/or filters that may be used by system components when generating a response to the user query or user command. The one or more computer-executable operations and/or filters associated with each of the plurality of competency classifications may be different and distinct and thus, may be used to process user queries and/or user commands differently as well as used to process user data (e.g., transaction data obtained from external data sources 160).

Additionally, the competency classification machine learning model 120 may function to implement a single deep machine learning algorithm that has been trained to identify multiple competency classification labels. Alternatively, the competency classification machine learning model 120 may function to implement an ensemble of deep machine learning algorithms in which each deep machine learning algorithm of the ensemble functions to identify a single competency classification label for user input data. For example, if the competency classification model 120 is capable of identifying three distinct competency classification labels, such as Income, Balance, and Spending, then the ensemble of deep machine learning algorithms may include three distinct deep machine learning algorithms that classify user input data as Income, Balance, and Spending, respectively. While each of the deep machine learning algorithms that define the ensemble may individually be configured to identify a specific competency classification label, the combination of deep machine learning algorithms may additionally be configured to work together to generate individual competency classification labels. For example, if the system receives user input data that is determined to be highly complex (e.g., based on a value or computation of the user input data exceeding a complexity threshold), the system 100 may function to selectively implement a subset (e.g., three machine learning algorithms from a total of nine machine learning algorithms or the like) of the ensemble of machine learning algorithms to generate a competency classification label.

Additionally, the competency classification engine 120 may be implemented by the one or more computing servers, computer processors, and the like of the artificial intelligence virtual assistance platform no.

The slot identification engine 130 functions to implement one or more machine learning models to identify slots or meaningful segments of user queries or user commands and to assign a slot classification label for each identified slot. The one or more machine learning models implemented by the slot identification engine 130 may implement one or more trained deep machine learning algorithms (e.g., recurrent neural networks). The one or more deep machine learning algorithms of the slot identification engine 130 may be trained in any suitable manner including with sample data of user queries and user commands that have been slotted and assigned slot values and/or user system derived examples. Alternatively, the slot identification engine 130 may function to implement an ensemble of deep machine learning algorithms in which each deep machine learning algorithm of the ensemble functions to identify distinct slot labels or slot type labels for user input data. For example, slot identification engine 130 may be capable of identifying multiple distinct slot classification labels, such as Income, Account, and Date labels, then the ensemble of deep machine learning algorithms may include three distinct deep machine learning algorithms that function to classify segments or tokens of the user input data as Income, Account, and Date, respectively.

A slot, as referred to herein, generally relates to a defined segment of user input data (e.g., user query or user command) that may include one or more data elements (e.g., terms, values, characters, media, etc.). Accordingly, the slot identification engine 130 may function to decompose a query or command into defined, essential components that implicate meaningful information to be used when generating a response to the user query or command.

A slot label which may also be referred to herein as a slot classification label may be generated by the one or more slot classification deep machine learning models of the engine 130. A slot label, as referred to herein, generally relates to one of a plurality of slot labels that generally describes a slot (or the data elements within the slot) of a user query or user command. The slot label may define a universe or set of machine or program-comprehensible objects that may be generated for the data elements within an identified slot.

Like the competency classification engine 120, the slot identification engine 120 may implement a single deep machine learning algorithm or an ensemble of deep machine learning algorithms. Additionally, the slot identification engine 130 may be implemented by the one or more computing servers, computer processors, and the like of the artificial intelligence virtual assistance platform 110.

The machine learning models and/or the ensemble of machine learning models may employ any suitable machine learning including one or more of: supervised learning (e.g., using logistic regression, using back propagation neural networks, using random forests, decision trees, etc.), unsupervised learning (e.g., using an Apriori algorithm, using K-means clustering), semi-supervised learning, reinforcement learning (e.g., using a Q-learning algorithm, using temporal difference learning), and any other suitable learning style. Each module of the plurality can implement any one or more of: a regression algorithm (e.g., ordinary least squares, logistic regression, stepwise regression, multivariate adaptive regression splines, locally estimated scatterplot smoothing, etc.), an instance-based method (e.g., k-nearest neighbor, learning vector quantization, self-organizing map, etc.), a regularization method (e.g., ridge regression, least absolute shrinkage and selection operator, elastic net, etc.), a decision tree learning method (e.g., classification and regression tree, iterative dichotomiser 3, C4.5, chi-squared automatic interaction detection, decision stump, random forest, multivariate adaptive regression splines, gradient boosting machines, etc.), a Bayesian method (e.g., naïve Bayes, averaged one-dependence estimators, Bayesian belief network, etc.), a kernel method (e.g., a support vector machine, a radial basis function, a linear discriminate analysis, etc.), a clustering method (e.g., k-means clustering, expectation maximization, etc.), an associated rule learning algorithm (e.g., an Apriori algorithm, an Eclat algorithm, etc.), an artificial neural network model (e.g., a Perceptron method, a back-propagation method, a Hopfield network method, a self-organizing map method, a learning vector quantization method, etc.), a deep learning algorithm (e.g., a restricted Boltzmann machine, a deep belief network method, a convolution network method, a stacked auto-encoder method, etc.), a dimensionality reduction method (e.g., principal component analysis, partial least squares regression, Sammon mapping, multidimensional scaling, projection pursuit, etc.), an ensemble method (e.g., boosting, bootstrapped aggregation, AdaBoost, stacked generalization, gradient boosting machine method, random forest method, etc.), and any suitable form of machine learning algorithm. Each processing portion of the system 100 can additionally or alternatively leverage: a probabilistic module, heuristic module, deterministic module, or any other suitable module leveraging any other suitable computation method, machine learning method or combination thereof. However, any suitable machine learning approach can otherwise be incorporated in the system 100. Further, any suitable model (e.g., machine learning, non-machine learning, etc.) can be used in implementing the machine learning-based virtual assistant and/or other components of the system 100.

The slot value extraction unit 135 functions to generate slot values by extracting each identified slot and assigned slot label of the user query or user command and converting the data elements (i.e., slot data) within the slot to a machine or program-comprehensible object or instance (e.g., term or value); that is, the slot label is mapped to coding or data that a computer or program of the system 100 comprehends and is able to manipulate or execute processes on. Accordingly, using the slot label generated by the slot identification engine 130, the slot extraction unit 135 identifies a set or group of machine or program-comprehensible objects or instances that may be applied to slot data of a slot assigned with the slot label. Thus, the slot extraction unit 135 may convert the slot data of a slot to a machine or program-comprehensible object (e.g., slot values) based on the slot label and specifically, based on the available objects, instances, or values mapped to or made available under the slot label.

The observables extractor 140 functions to use the slot values comprising the one or more program-comprehensible objects generated at slot extraction unit 135 to determine or generate one or more handlers or subroutines for handling the data of or responding to the user query or user command of user input data. The observables extractor 140 may function to use the slot values provided by the slot extraction unit 135 to determine one or more data sources relevant to and for addressing the user query or the user command and determine one or more filters and functions or operations to apply to data accessed or collected from the one or more identified data sources. Thus, the coding or mapping of the slot data, performed by slot extraction unit 135, to program-comprehensible objects or values may be used to specifically identify the data sources and/or the one or more filters and operations for processing the data collected from the data sources.

The response generator 150 functions to use the competency classification label of the user input data to identify or select one predetermined response template or one of a plurality of predetermined response templates. For each competency classification label of the system 100, the system 100 may have stored a plurality of response templates that may be selected by the response generator 150 based on an identified competency classification label for user input data. Additionally, or alternatively, the response template may be selected based on both the competency classification label and one or more generated slot values. In such instance, the one or more slot values may function to narrow the pool of response template selectable by the response generator to a subset of a larger pool of response templates to consider the variations in a query or user command identified in the slot values. The response templates may generally a combination of predetermined output language or text and one or more input slots for interleaving the handler outputs determined by the observables extractor 140.

The user interface system 105 may include any type of device or combination of devices capable of receiving user input data and presenting a response to the user input data from the artificially intelligent virtual assistant. In some embodiments, the user interface system 105 receives user input data in the form of a verbal utterance and passes the utterance to the automatic speech recognition unit 115 to convert the utterance into text. The user interface system 105 may include, but are not limited to, mobile computing devices (e.g., mobile phones, tablets, etc.) having a client application of the system 100, desktop computers or laptops implementing a web browser, an automated teller machine, virtual and/or personal assistant devices (e.g., Alexa, Google Home, Cortana, Jarvis, etc.), chatbots or workbots, etc. An intelligent personal assistant device (e.g., Alexa, etc.) may be any type of device capable of touchless interaction with a user to performing one or more tasks or operations including providing data or information and/or controlling one or more other devices (e.g., computers, other user interfaces, etc.). Thus, an intelligent personal assistant may be used by a user to perform any portions of the methods described herein, including the steps and processes of method 200, described below. Additionally, a chatbot or a workbot may include any type of program (e.g., slack bot, etc.) implemented by one or more devices that may be used to interact with a user using any type of input method (e.g., verbally, textually, etc.). The chatbot or workbot may be embedded or otherwise placed in operable communication and/or control of a communication node and thus, capable of performing any process or task including, but not limited to, acquiring and providing information and performing one or more control operations.

2. Method for Generating a Training Corpus Multi-Intent and Multi-Turn Utterance Data As shown in FIG. 2, a method 200 constructing a training corpus of synthesized multi-intent and/or multi-turn utterance data includes sourcing single-intent utterance data S210, configuring one or more input sources accessible for generating training data S220, generating a training corpus of multi-intent and/or multi-turn utterances S230, and synthesizing a multi-intent utterance S240.

2.1 Sourcing Single-Intent Utterance Data

S210, which includes souring utterance data, may function to source from one or more data sources a corpus of single-intent utterance data. A single-intent utterance as referred to herein preferably relates to a singular query or a singular command that may be made by a human user relating to a single intent or a single domain. Preferably, each single-intent utterance within the corpus includes an in-domain utterance and/or an utterance relating to a singular intent or a same topic. For instance, a corpus of in-domain utterances (e.g., patient health utterances corpus) in a first corpus may include utterances relating to a single distinct intent and/or a single topic that may be covered in conversations relating to a conversational domain relating to a health of a patient and/or any typical interaction between a patient and a doctor. In another example, a second corpus of single-intent utterances (e.g., user banking utterances corpus) may relate to utterances relating to a type or kind of banking transaction.

It shall be noted that, while it may be preferred that a corpus of in-domain utterances includes utterances relating to a single intent or a distinct intent, the corpus of in-domain utterances may, in some embodiments, include multiple related or cognate intents that fall within a scope of a designated domain of the in-domain corpus.

In a first implementation, S210 may function to source single-intent utterance data from a deployed dialogue system by randomly sampling or pulling single-intent utterance data from the production logs of the deployed dialogue system. Preferably, the deployed dialogue system relates to a dialogue system of a subscriber to the conversational dialogue service and/or system 100. Accordingly, the production logs of such deployed system may include thousands or millions of historical user queries, user utterances, and/or user commands posed to or provided as input into the deployed dialogue system. It shall be noted that S210 may function to construct the machine learning training corpus using sampled data from any suitable user logs, systems or repositories having real or synthetic user query and/or user command data including, from recordings or transcripts between a user and a representative or agent of an entity (e.g., a customer service agent) or between a user and a virtual agent.

In a second implementation, S210 may function to source single-intent utterance data based on implementing one or more intelligent crowdsourcing techniques, as described in U.S. Pat. No. 10,296,848, which is incorporated herein in its entirety by this reference. In the second implementation, the intelligent crowdsourcing techniques may be implemented with internal systems and/or internal agents of a subscriber to the conversational dialogue service and/or with one or more remote third-party crowdsourcing platforms. Additionally, or alternatively, S210 may function to intelligently curate the single-intent utterance data sourced via the one or more intelligent data curation techniques, as described in U.S. Pat. No. 10,303,978, which is incorporated herein in its entirety by this reference.

In a third implementation, S210 may function to construct and/or source a corpus of single-intent utterance data based on artificial and/or engineered utterances. In such embodiments, a plurality of distinct utterances may be engineered by one or more skilled artisans (e.g., developers, engineers, etc.) of an artificially intelligent deployed system or the like. Accordingly, in such embodiments, one or more ideal (or prototypical) user utterances may be manually-generated by an engineer or developer associated with the deployed dialogue system. The engineered single-intent user utterances preferably include individual queries and/or individual commands (or statements) that are distinct from the real user utterance data of a deployed dialogue system. In some embodiments, the engineered utterances may be variations (or enhancements) of real user utterances.

Additionally, or alternatively, S210 may function to source utterance data from any combination of utterance data sources including each of the data sources of the first implementation, the second implementation, and/or the third implementation described herein above. In such embodiments, S210 may function to configure a mixture of the single-intent utterance corpus to include a combination of historical or real user utterance data from a deployed system, engineered user utterance data, and/or crowdsourced and curated utterance data.

2.2 Configuring Input Sources for Generating Multi-Intent Training Samples

S220, which includes configuring one or more input sources accessible for generating training data, may function to set one or more input sources for generating a corpus of multi-intent and/or multi-utterance data.

In a preferred embodiment, S220 may function to set, as an input source, at least one corpus of single-intent utterances. Preferably each of the single-intent utterances may include non-complex (e.g., an input having a sentence structure below a complexity threshold), single-turn utterances that may be easily and/or suitably consumed by traditional dialogue systems. The input source comprising of the at least one corpus of single-intent utterances preferably includes single-utterance data sourced in S210 and/or sourced in any suitable manner including sourced from production logs of deployed dialogue systems and/or sourced from a corpus of engineered utterances.

S220 may additionally, or alternatively function to set as, as another input source, a set or a grouping of a plurality of conjunction terms. For instance, the set of conjunction terms preferably includes common English conjunction words such as "and," "but," "yet," "however," "also," "plus," etc. It shall be noted that the set of conjunction terms may include any number of and/or any type of conjunction terms and/or similar terms that may be used in conversation to join multiple distinct single-intent or multi-intent utterances.

Additionally, and/or optionally, S220 may function to set as a further input source a corpus of out-of-domain utterances. That is, S220 may function to construct a corpus of out-of-domain utterances that relate to and/or are in a domain other than a domain of the corpus of in-domain single utterances. In one embodiment, S220 may function to source out-of-domain single utterance data from the Cornel Movie-Dialogs Corpus or similar corpora of out-of-domain utterance data.

2.3 Generating Synthesized Multi-Intent and/or Multi-Turn Training Samples

Figure 4:
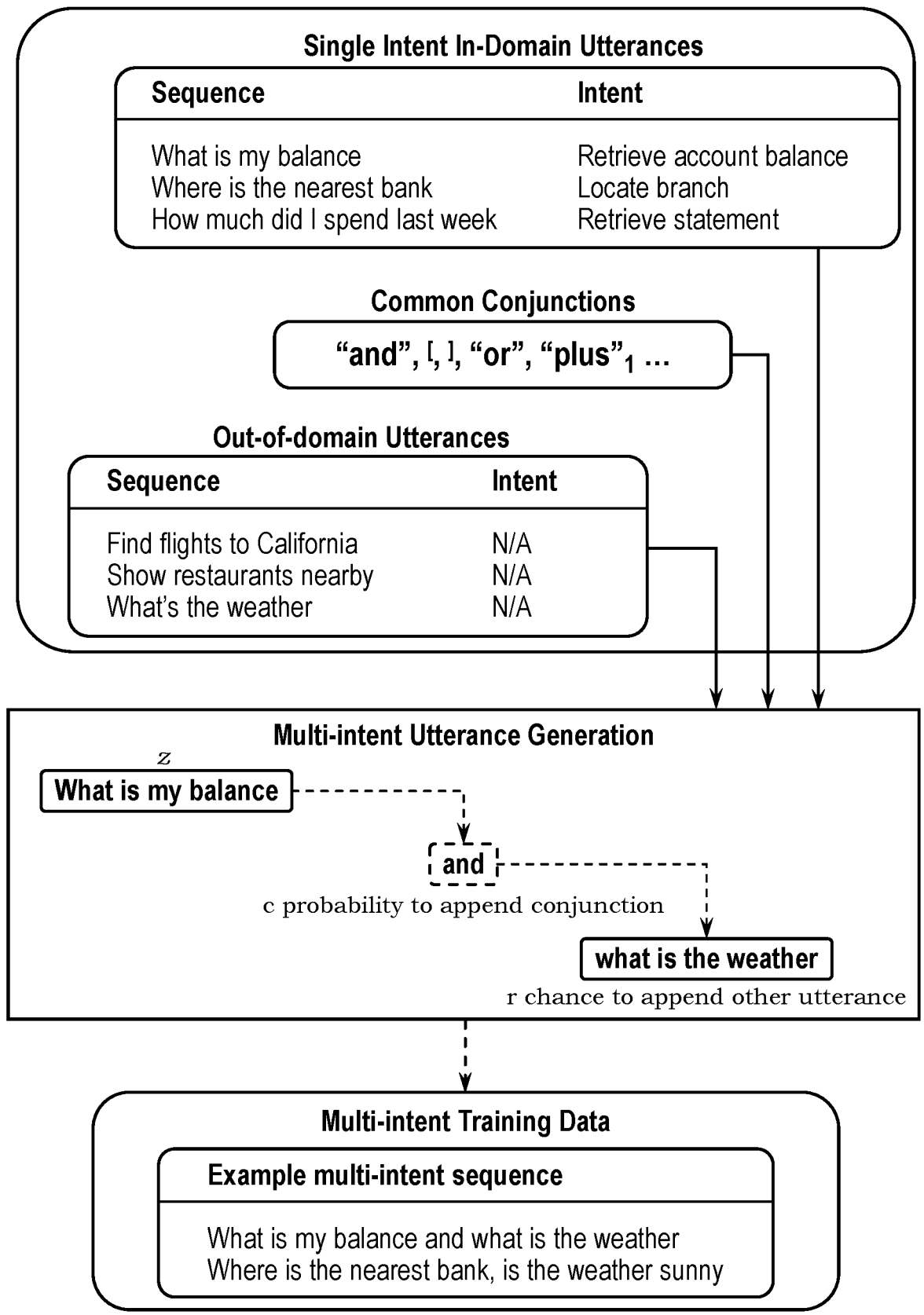
FIG. 4 illustrates an example schematic for implementing portions of the method 200 and a system in accordance with one or more embodiments of the present application.

S230, which includes generating a training corpus of multi-intent and/or multi-turn utterances, may function to generate training sample utterances suitable for a training corpus of multi-intent and/or multi-turn sample utterances, as shown by way of example in FIG. 4.

In a preferred embodiment, S230 may function to randomly sample from a corpus of in-domain, single-intent utterances a single-intent utterance. Preferably, the single-intent utterance includes an example query or command sentence (with or without punctuation) that corresponds to one expected or recognized intent of a dialogue system. S230 may function to repeat a random selection of single-utterance from the corpus of single-intent utterances until a training corpus of multi-intent and/or multi-turn training samples is formed.

2.4 Multi-Intent Utterance Corpus Formation with Multiple Single-Intent Utterance Data S240, which includes synthesizing a multi-intent utterance, may function to probabilistically augment a single-intent utterance with a conjunction term and one of an additional, distinct, in-domain single-intent utterance and an out-of-domain utterance.

In one embodiment, S240 may function to compute or identify a random probability value (i) that a selected single-intent utterance may be appended with a conjunction term. In such embodiment, S240 may function to assess the random probability value of augmenting a conjunction with the selected single-intent utterance against a conjunction-inclusion probability (c) threshold.

In the circumstance that the random probability value satisfies or exceeds the conjunction-inclusion probability threshold, S240 may function to randomly select, from a predetermined set of conjunction terms, a conjunction term and append the randomly selected conjunction term to the single-intent utterance. Preferably, S240 may function to append the conjunction term to an end of the single-intent utterance. Additionally, or alternatively, S240 may function to append the selected conjunction term ahead of a beginning of the single-intent utterance. Additionally, or alternatively, a probabilistic evaluation for adding a conjunction term may be performed between any two distinct utterance segments along a multi-intent utterance. For example, a multi-intent utterance may include an <in-domain>, <out-of-domain>, <in-domain>, <in-domain>. In such example, an evaluation of a conjunction term inclusion probability may be performed for each position between adjacent pairs of utterances or sequential utterances.

Additionally, or alternatively, S240 may function to compute or identify a random probability value (j) that a selected single-intent utterance may be appended with one of an out-of-domain single-intent utterance and an in-domain single-intent utterance. In one embodiment, S240 may function to select an out-of-domain utterance from a corpus of out-of-domain single-intent utterances distinct from the corpus of in-domain single-intent utterances. In such embodiment, S240 may function to assess the random probability value of augmenting an out-of-domain single intent utterance or an in-domain single-intent utterance with the selected single-intent utterance (and conjunction) against an out-of-domain (or in-domain)-inclusion probability (r) threshold.

In the circumstance that the random probability value (j) satisfies or exceeds the out-of-domain (or in-domain)-inclusion probability (r) threshold, S240 may function to randomly select, from a corpus of out-of-domain single-intent utterances, an out-of-domain sample utterance and append the randomly selected out-of-domain sample utterance to the single-intent utterance. Preferably, S240 may function to append the out-of-domain sample utterance at or around a randomly inserted conjunction term. Thus, depending on a location of the conjunction term, S240 may function to append the out-of-domain sample utterance after (the conjunction of) the single-intent utterance or before (the conjunction of) the single-intent utterance.

It shall be noted that, in some embodiments, S240 may function to randomly select either an in-domain single-intent utterance or an out-of-domain single-intent utterance based on a probability of inclusion factor. In the circumstance that S240 augments a single-intent utterance with another in-domain single-intent utterance, the in-domain utterance may be selected from a same corpus of single-intent utterances. Additionally, or alternatively, the in-domain utterance may be selected from a distinct corpus of single-intent utterance different from the corpus from which the subject single-intent utterance was selected.

Accordingly, S240 may function to individually construct distinct multi-intent and/or multi-turn training sample utterance by conjoining a single-intent utterance from a corpus of in-domain single-intent utterances with a conjunction term and further, followed by conjoining a randomly-selected utterance from the corpus of in-domain single-intent utterances or the corpus of out-of-domain single-intent utterances to the single-intent utterance and conjunction term. It shall be noted that a subject synthetic multi-intent utterance formed using the method(s) described in at least method 200 may include multiple in-domain and/or multiple out-of-domain utterances including multi-intent utterances having more than two utterance segments.

Additionally, or alternatively, S240 may function to perform conjoining of single-intent utterances together with conjunction terms until a sufficient training corpus size that satisfies a diversity metric threshold and/or a coverage metric threshold, as described in U.S. Pat. No. 10,303,978, which is incorporated herein in its entirety by this reference.

2.5 Span Classification Model Training

Optionally, S250, which includes training a multi-intent and/or multi-turn classifier model, may function to train a selected classifier model using the training corpus of multi-intent and/or multi-turn utterance training samples. S240 may function to train any suitably selected model using a combination of crowdsourced training samples and/or artificially diverse training sample utterances from the training corpus. Accordingly, a resulting trained classifier model may function to accurately predict distinct labels for each intent of a test input sample or real-word user utterance or conversation containing multiple intents and multiple turns between distinct parties in a conversation.

In a preferred embodiment, S250 may function to train a conditional random field and/or a bidirectional Long Short-Term Memory (BiLSTM) model to predict intent or sentence boundaries using the training corpus of multi-intent and/or multi-turn training samples.

It shall be noted that S250 may function to implement any suitable model including, but not limited to, a sequence labeling algorithm or model, such as conditional random forest models, directional long short-term memory models, and the like. Additionally, or alternatively, in some embodiments, one or more types of non-sequence labelling models may be implemented by S250.

3. Multi-Intent/Multi-Turn Utterance Segmentation & Utterance Classification

As shown in FIG. 3, a method 300 for handling multi-intent and/or multi-turn utterances includes predicting sentence boundaries of a multi-sentence utterance S310, identifying one or more boundary tokens and classifying tokens S320, segmenting the multi-intent and/or the multi-turn utterance based on boundary labels S330, and optionally or additionally, individually feeding each sentence segment to one or more classifier models S340.

S310, which includes predicting segment boundaries of a multi-intent utterance, may function to identify and/or predict one or more segment boundaries (or intent boundaries) of a given input of a multi-intent utterance and/or a multi-turn utterance using a trained segment classification model. In a preferred embodiment, the segment classification model may be trained using the training corpus of artificially synthesized multi-intent and/or multi-turn utterances. In one or more embodiments, the trained segment classification model may include one of a singular span-predicting utterance segmentation model or a joint model. The singular span-prediction utterance segmentation model preferably functions to classify or identify each distinct utterance span of a distinct multi-intent utterance that forms a complete semantic expression within the distinct multi-intent utterance. Additionally, or alternatively, the trained segment classification model comprises one or more of a trained BiLSTM model, a trained joint BiLSTM, a trained joint BiLSTM with segmentation, a trained conditional random forest (CRF) model, a joint CRF, a joint CRF with segmentation, and/or any suitable sequence labelling model and/or intent/slot value classification model.

Accordingly, in one or more embodiments, S310 may function to predict boundary or span labels for multiple boundaries based on an input of a multi-intent and/or multi-turn utterance from a user and/or between a plurality of users involved in a conversation or dialogue.

S320, which includes identifying one or more input tokens and classifying boundary tokens, may function to identify and/or represent input tokens in each identified sentence segment of a multi-intent and/or multi-turn utterance and further, perform boundary classification of the boundary input tokens for each segment.

In one embodiment, S320 preferably functions to individually assess each segment and/or token of a given multi-intent and/or multi-turn utterance and generate a boundary label for each utterance segment of the given multi-intent and/or multi-turn utterance. That is, in some embodiments, S320 may function to demarcate and distinctly boundary tokenize and label a single token within each sentence or utterance segment. For example, in the utterance "What is my account balance and show the last transaction", S310 would predict "what is my account balance" [seg_1] and "show the last transaction" [seg_2] as distinct intents and/or distinct sentence segments. Thereafter, S320 would set boundary input tokens within each sentence segment, such as "What is my account balance" and "show the last transaction" which clearly distinguishes a boundary input token within each segment. It shall be noted that, in some embodiments, the conjunction term 'and' may typically be included with the segment of which the conjunction term immediately precedes (e.g., "and show the last transaction").

Additionally, or alternatively, S320 may function to implement a token-level binary label prediction task. In one embodiment, the boundary input tokens may be received as input into a trained boundary classifier (e.g., a trained BiLSTM model, a trained CRF model, or the like). In such embodiment, the trained boundary classifier preferably functions to classify each boundary input token according to one of two available boundary labels, such as either end-word or !end-word. A first of the two boundary labels (e.g., end-word) of the boundary classifier preferably functions to classify a boundary input token that forms an intermediate boundary in a middle of a multi-intent and/or multi-turn utterance. A second of the two boundary labels of the boundary classifier preferably functions to classify a boundary input token that forms the most terminal boundary typically found at the end of the last sentence segment of the multi-intent and/or multi-turn utterance.

It shall be noted that, in some circumstances, a span detection model or the like may be trained to detect end or end boundary terms, in some embodiments, S320 may function to train a span detection model to predict start words or boundary terms at a beginning of a distinct utterance segment. Additionally, or alternatively, a span detection mode or the like may be trained to detect both end boundary terms and start/beginning boundary terms.

In one or more embodiments, a joint model may include a single multi-task model that functions to predict token-level intent and predict slot value classification labels for each token within an utterance. In one implementation of the joint model, the method 300 may function to predict slot classification/slot filling labels only for tokens within an utterance having an existing intent classification label (as predicted by the joint model or otherwise). Thus, the joint model may function to generate multiple classification label per token, which may include an intent classification labels and a slot filling label.

While the joint model or utterance handling ensemble may function to handle any suitable utterance, the method 300 may preferably input an subject multi-intent utterance in circumstances or instances in which an entangled multi-intent utterance may be identified or detected during a processing of an input utterance in the method 300 and/or as an advance step performed before implementing the method 300. An entangled, multi-utterance preferably relates to or includes a multi-intent utterance in which two or more distinct intents within the utterance cannot be easily disintegrated and/or satisfy an entanglement threshold or a segmentability threshold. The entanglement threshold preferably includes a maximum dependency value that indicates a degree to which two or more intents may depend on a former or a latter intent of the two or more intents for context which informs a comprehension or an understanding of one or both of the former or the latter intent within an entangled, multi-intent utterance. That is, while an input multi-intent utterance may include independent and/or distinct intent instances, a structure of the input utterance may not allow for a simple disintegration or separation with a standard segmentation model since each distinct intent segment within the input utterance may function to inform or provide context for a former or a latter intent segment within the utterance.

Thus, if a subject multi-intent utterance satisfies the entanglement threshold, the method 300 may function to designate or flag the subject multi-intent utterance as an entangled multi-intent utterance and pass the subject entangled multi-intent utterance as an input utterance into a joint model for classifying the distinct segments or boundary tokens for each segment component and generating intent classification labels one or more tokens within each distinct segment component of the utterance.

S330, which includes segmenting an utterance based on boundary labels, may function to break a multi-intent and/or multi-turn utterance into its constituent sentence/intent segments based on words in each sentence segment labeled by the boundary classifier. For instance, S330 may function to break an input utterance at the boundary label of end-word or the like.

In one variant implementation, the method 300 may function to implement a joint model with segmentation that usurps the distinct segmentation task and integrates the segmentation with one or preferably, both, a span or boundary classification task and the intent classification tasks. That is, in a preferred embodiment of the variant implementation, the joint model may include a single, multi-task machine learning model (an ensemble) that performs at least three distinct tasks including span and/or boundary classification of an utterance, token-level intent classification for the utterance, and slot value/filling labels for the utterance. In such embodiments, the method 300 may function to implement the joint model with segmentation to first segment an input utterance into its distinct utterance components (i.e., two or more utterance components) and additionally function to predict token-level intent and predict slot value classification labels along each of the distinct utterance components of the input utterance (e.g., an input multi-intent utterance and/or an input multi-turn utterance).

While the joint model with segmentation may be applied to any suitable input utterance, the method 300 may preferably apply the joint model with segmentation in circumstances or instances in which a long, multi-intent utterance may be identified or detected within or prior to the method 300. A long, multi-intent utterance preferably relates to or includes a multi-intent utterance in which an aggregate of the multiple distinct intent/utterance spans of the multi-intent utterance satisfies or exceeds an aggregated span threshold. The aggregated span threshold preferably includes a maximum span value under which a standard model or a standard joint model without segmentation may be applied to a multi-intent and/or a multi-turn utterance with reasonable efficacy. Accordingly, in use, the joint model with segmentation may function to support an unlimited number of intents per utterance irrespective of the span length.

Optionally, or additionally, S340 may function to individually feed each identified sentence/intent segment to one or more downstream single-intent machine learning-based classifiers.

In one implementation, S340 may function to serially feed, as input, each of the distinct intent segments into a single downstream single-intent classifier pipeline classifier models S340.

Figure 5:
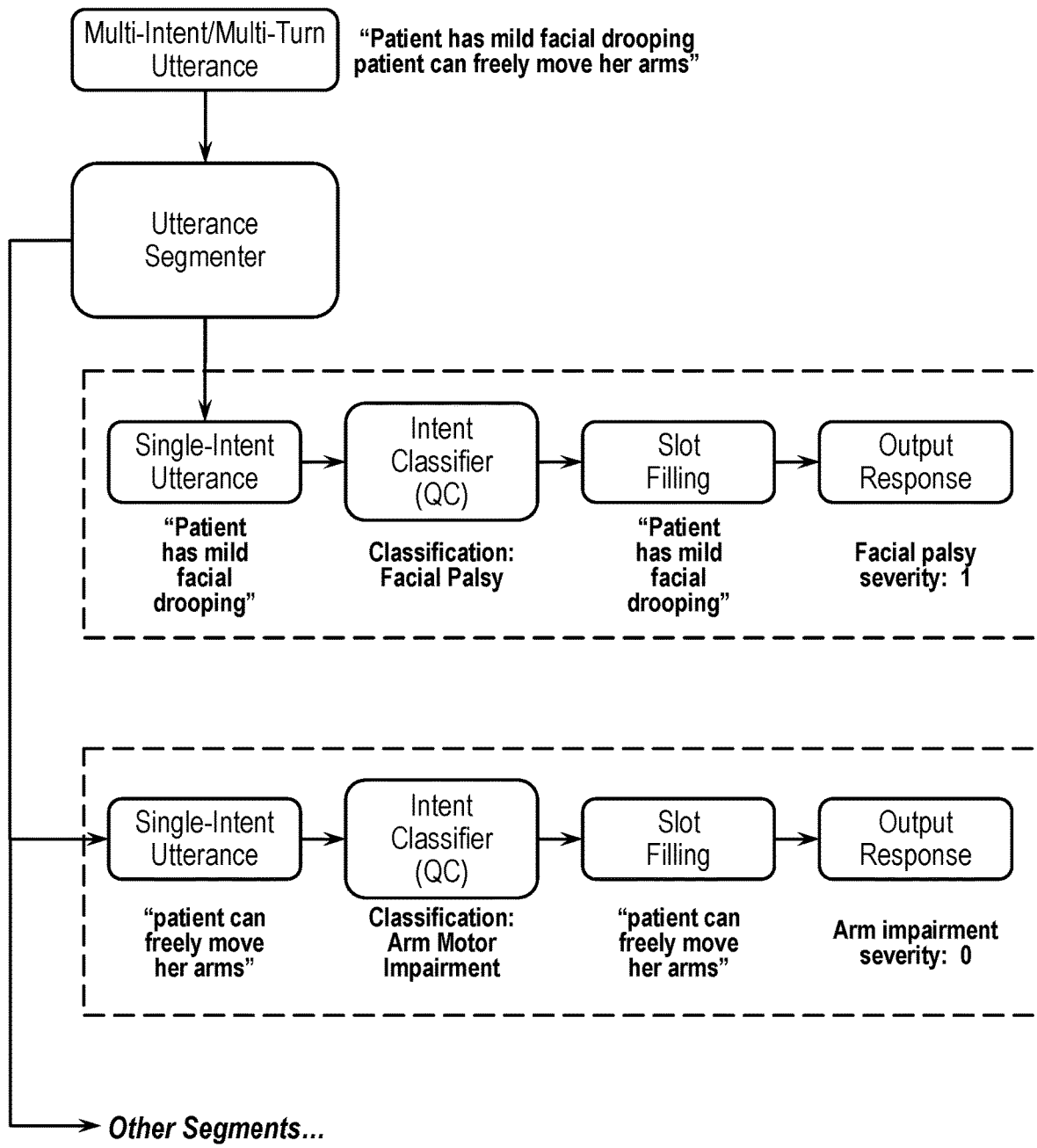
FIG. 5 illustrates an example schematic for implementing portions of the method 300 and a system in accordance with one or more embodiments of the present application.

In a second implementation, S340 may function to feed, as input each of the distinct intent segments into multiple, distinct instances of a downstream single-intent classifier pipeline, as shown by way of example in FIG. 5. In such second implementation, S340 may function to provide each intent segment in parallel to the multiple, distinct instances of the downstream single-intent classifier pipeline.

Optionally, or additionally, S350 may function to generate a response to a multi-intent utterance and/or a multi-turn utterance. In a preferred embodiment, S350 may function to implement a response generator, such as the response generator 150, to build a response to each of the multiple intents of a multi-intent utterance. While the methods 200 and/or 300 may be domain agnostic, S350 may function to generate a response based on a domain of the one or more intents of a multi-intent utterance, which may include, but should not be limited to, responding conversationally via a virtual dialogue agent, performing one or more functions or actions responsive to the utterance, collecting data and/or building one or more graphical outputs via a user interface or the like, etc.

The system and methods of the preferred embodiment and variations thereof can be embodied and/or implemented at least in part as a machine configured to receive a computer-readable medium storing computer-readable instructions. The instructions are preferably executed by computer-executable components preferably integrated with the system and one or more portions of the processors and/or the controllers. The computer-readable medium can be stored on any suitable computer-readable media such as RAMs, ROMs, flash memory, EEPROMs, optical devices (CD or DVD), hard drives, floppy drives, or any suitable device. The computer-executable component is preferably a general or application specific processor, but any suitable dedicated hardware or hardware/firmware combination device can alternatively or additionally execute the instructions.

Although omitted for conciseness, the preferred embodiments include every combination and permutation of the implementations of the systems and methods described herein.

As a person skilled in the art will recognize from the previous detailed description and from the figures and claims, modifications and changes can be made to the preferred embodiments of the invention without departing from the scope of this invention defined in the following claims.

What is claimed is:

1. A method for synthesizing training data for multi-intent utterance segmentation within a machine learning-based dialogue system, the method comprising:
   identifying a first corpus of utterances comprising a plurality of distinct single-intent in-domain utterances;
   identifying a second corpus of utterances comprising a plurality of distinct single-intent out-of-domain utterances;
   identifying a third corpus comprising a plurality of distinct conjunction terms;
   forming, by the machine learning-based dialogue system, a multi-intent training corpus comprising synthetic multi-intent utterances, wherein forming each distinct multi-intent utterance of the multi-intent training corpus includes:
      selecting a first distinct in-domain utterance from the plurality of distinct single-intent in-domain utterances of the first corpus of utterances;
      probabilistically selecting one of a first out-of-domain utterance from the second corpus of utterances and a second in-domain utterance from the first corpus of utterances;
      probabilistically selecting or not selecting a distinct conjunction term from the third corpus of conjunction terms;
      forming a synthetic multi-intent utterance including appending the first in-domain utterance with one of the first out-of-domain utterance from the second corpus of utterances and the second in-domain utterance from the first corpus of utterances;
   training a joint model using the multi-intent training corpus comprising synthetic multi-intent utterances, wherein the joint model performs multiple distinct machine learning tasks, the joint model comprising an intent machine learning classifier that predicts an intent label for a target utterance and a slot segment machine learning model that predicts a slot label that identifies a semantic concept of a given segment of the target utterance;
   receiving an input multi-intent utterance; and
   identifying whether the input multi-intent utterance is an entangled multi-intent utterance based on an entanglement threshold, wherein the entangled multi-intent utterance relates to a subject multi-intent utterance in which two or more distinct intents within the subject multi-intent utterance cannot be disintegrated with ease and satisfy or exceed the entanglement threshold.

2. The method according to claim 1, further comprising:
   identifying a conjunction-inclusion probability that a conjunction term would be appended to the first distinct in-domain utterance; and
   if the conjunction-inclusion probability satisfies or exceeds a conjunction-inclusion threshold, randomly selecting the distinct conjunction term from the plurality of distinct conjunction terms of the third corpus.

3. The method according to claim 1, further comprising:
   identifying an out-of-domain-inclusion probability that an out-of-domain utterance would be appended to the first distinct in-domain utterance, wherein if the out-of-domain-inclusion probability satisfies or exceeds an out-of-domain-inclusion threshold, randomly selecting a first distinct out-of-domain utterance from the plurality of distinct single-intent out-of-domain utterances of the second corpus of utterances.

4. The method according to claim 3, further comprising:
   in response to selecting the first distinct out-of-domain utterance, concatenating the distinct conjunction term to a boundary of the first in-domain utterance and concatenating the first distinct out-of-domain utterance after the distinct conjunction term.

5. The method according to claim 1, further comprising:
identifying an out-of-domain-inclusion probability that an out-of-domain utterance would be appended to the first distinct in-domain utterance, wherein if the out-of-domain-inclusion probability does not satisfy the out-of-domain-inclusion threshold, randomly selecting a second distinct in-domain utterance from the plurality of distinct single-intent in-domain utterances of the first corpus of utterances.

6. The method according to claim 1, further comprising:
identifying a conjunction-inclusion probability that a conjunction term would be appended to the first distinct in-domain utterance;
if the conjunction-inclusion probability satisfies or exceeds a conjunction-inclusion threshold, randomly selecting the distinct conjunction term from the plurality of distinct conjunction terms of the third corpus;
identifying an out-of-domain-inclusion probability that an out-of-domain utterance would be appended to the first distinct in-domain utterance, wherein:
  (i) if the out-of-domain-inclusion probability satisfies or exceeds an out-of-domain-inclusion threshold, randomly selecting a first distinct out-of-domain utterance from the plurality of distinct single-intent out-of-domain utterances of the second corpus of utterances, or
  (ii) if the out-of-domain-inclusion probability does not satisfy the out-of-domain-inclusion threshold, randomly selecting a second distinct in-domain utterance from the plurality of distinct single-intent in-domain utterances of the first corpus of utterances.

7. The method according to claim 1, wherein:
each of the plurality of distinct single-intent in-domain utterances of the first corpus comprise a single-intent in-domain utterance, and
each of the plurality of distinct single-intent out-of-domain utterances of the second corpus comprise a single-intent out-of-domain utterance.

8. The method according to claim 1, further comprising:
training a span-predicting utterance segmentation model using the multi-intent training corpus, wherein the span-predicting utterance segmentation model classifies each distinct utterance span of a subject multi-intent utterance that forms a complete semantic expression within the subject multi-intent utterance.

9. The method according to claim 8, further comprising:
receiving the input multi-intent utterance at the machine learning-based dialogue system;
predicting two or more boundary classification labels for two or more distinct tokens of the input multi-intent utterance; and
segmenting, at two or more boundary classification labels, the input multi-intent utterance into two or more distinct single-intent utterance components.

10. The method according to claim 9, further comprising:
providing each of the two or more distinct single-intent utterance components to one of a plurality of concurrently operating distinct single-intent machine learning classifiers; and
generating by each respective one of the plurality of concurrently operating distinct machine learning classifiers an intent classification label for each of the two or more distinct single-intent utterance components.

11. The method according to claim 1, wherein:
if the input multi-intent utterance comprises the entangled multi-intent utterance, providing the entangled multi-intent utterance as input into the joint model;
at the joint model, predicting an intent classification label and a slot value classification label for each identified token of the entangled multi-intent utterance.

12. The method according to claim 1, further comprising:
training a joint model with segmentation using the multi-intent training corpus comprising synthetic multi-intent utterances, where the joint model with segmentation performs multi-distinct machine learning tasks, the joint model with segmentation including a combination of (i) a segmentation model, (ii) an intent classification model, and (iii) a slot value classification model.

13. The method according to claim 12, further comprising:
receiving the input multi-intent utterance; and
identifying whether the input multi-intent utterance comprises a long, multi-intent utterance based on an aggregated span threshold, wherein the long, multi-intent utterance relates to a subject multi-intent utterance in which an aggregate of multiple distinct utterance spans of the subject multi-intent utterance satisfies or exceeds the aggregated span threshold.

14. The method according to claim 13, wherein:
if the input multi-intent utterance comprises the long multi-intent utterance, providing the long multi-intent utterance as input into the joint model with segmentation;
at the joint model with segmentation, (i) predicting two or more boundary classification labels for two or more distinct tokens of the long multi-intent utterance, (ii) predicting an intent classification label and (iii) a slot value classification label for each identified token of the long multi-intent utterance.

15. The method according to claim 1, further comprising:
computing, by the machine learning-based system, a conjunction-inclusion probability that a conjunction term would be appended to the first distinct in-domain utterance;
if the conjunction-inclusion probability satisfies or exceeds a conjunction-inclusion threshold, randomly selecting the distinct conjunction term from the plurality of distinct conjunction terms of the third corpus;
computing, by the machine learning-based system, an out-of-domain-inclusion probability that an out-of-domain utterance would be appended to the first distinct in-domain utterance, wherein:
  (i) if the out-of-domain-inclusion probability satisfies or exceeds an out-of-domain-inclusion threshold, randomly selecting a first distinct out-of-domain utterance from the plurality of distinct single-intent out-of-domain utterances of the second corpus of utterances, or
  (ii) if the out-of-domain-inclusion probability does not satisfy the out-of-domain-inclusion threshold, randomly selecting a second distinct in-domain utterance from the plurality of distinct single-intent in-domain utterances of the first corpus of utterances.

16. A method for synthesizing training data for multi-intent utterance segmentation within a single-intent machine learning-based dialogue system, the method comprising:
sourcing a first corpus of utterances comprising a plurality of distinct single-intent in-domain utterances;
sourcing a second corpus of utterances comprising a plurality of distinct single-intent out-of-domain utterances;
sourcing a third corpus comprising a plurality of distinct conjunction terms;

constructing, by the machine learning-based dialogue system, a multi-intent training corpus comprising synthetic multi-intent utterances, wherein forming each distinct multi-intent utterance of the multi-intent training corpus includes:
  selecting a first distinct in-domain utterance from the plurality of distinct single-intent in-domain utterances of the first corpus of utterances;
  probabilistically selecting one of a first out-of-domain utterance from the second corpus of utterances and a second in-domain utterance from the first corpus of utterances;
  probabilistically selecting or not selecting a distinct conjunction term from the third corpus of conjunction terms;
  constructing a synthetic multi-intent utterance including appending the first in-domain utterance with one of the first out-of-domain utterance from the second corpus of utterances and the second in-domain utterance from the first corpus of utterances;
training a joint model using the multi-intent training corpus comprising synthetic multi-intent utterances, wherein the joint model performs multiple distinct machine learning tasks, the joint model comprising an intent machine learning classifier that predicts an intent label for a target utterance and a slot segment machine learning model that predicts a slot label that identifies a semantic concept of a given segment of the target utterance;
receiving an input multi-intent utterance; and
identifying whether the input multi-intent utterance is an entangled multi-intent utterance based on an entanglement threshold, wherein the entangled multi-intent utterance relates to a subject multi-intent utterance in which two or more distinct intents within the subject multi-intent utterance cannot be disintegrated with ease and satisfy or exceed the entanglement threshold.

17. A system for intelligently synthesizing training data for multi-intent utterance segmentation within a machine learning-based dialogue system, the system comprising:
  a datastore comprising:
    a first corpus of utterances comprising a plurality of distinct single-intent in-domain utterances;
    a second corpus of utterances comprising a plurality of distinct single-intent out-of-domain utterances;
    a third corpus comprising a plurality of distinct conjunction terms;
  a machine learning-based dialogue system being implemented by a distributed network of computers includes:
    a training data synthesis module:
      constructing a multi-intent training corpus comprising synthetic multi-intent utterances, wherein forming each distinct multi-intent utterance of the multi-intent training corpus includes:
        selecting a first distinct in-domain utterance from the plurality of distinct single-intent in-domain utterances of the first corpus of utterances;
        probabilistically selecting one of a first out-of-domain utterance from the second corpus of utterances and a second in-domain utterance from the first corpus of utterances;
        probabilistically selecting or not selecting a distinct conjunction term from the third corpus of conjunction terms; and
        constructing a synthetic multi-intent utterance including appending the first in-domain utterance with one of the first out-of-domain utterance from the second corpus of utterances and the second in-domain utterance from the first corpus of utterances;
  wherein the machine learning-based dialogue system:
    trains a joint model using the multi-intent training corpus comprising synthetic multi-intent utterances, wherein the joint model performs multiple distinct machine learning tasks, the joint model comprising an intent machine learning classifier that predicts an intent label for a target utterance and a slot segment machine learning model that predicts a slot label that identifies a semantic concept of a given segment of the target utterance;
    receives an input multi-intent utterance; and
    identifies whether the input multi-intent utterance is an entangled multi-intent utterance based on an entanglement threshold, wherein the entangled multi-intent utterance relates to a subject multi-intent utterance in which two or more distinct intents within the subject multi-intent utterance cannot be disintegrated with ease and satisfy or exceed the entanglement threshold.

* * * * *